Nov. 22, 1932.

C. G. MUNTERS

REFRIGERATION

Filed Dec. 8, 1926

Re. 18,665

INVENTOR

Carl Georg Munters

BY

Wm. T. Sedlund

ATTORNEY

Reissued Nov. 22, 1932

Re. 18,665

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

REFRIGERATION

Original No. 1,711,804, dated May 7, 1929, Serial No. 153,262, filed December 8, 1926. Application for reissue filed September 22, 1930. Serial No. 483,732.

My invention relates to refrigeration and more specifically to refrigeration of the absorption type wherein a refrigerant is alternately expelled from solution in a liquid and reabsorbed by the liquid. The purpose of my invention is to provide a simple refrigerating apparatus particularly adapted to use in or with domestic refrigerating cabinets. My invention aims to provide a simplified means of transferring heat from a space to be cooled and further aims to provide a simplified air cooled apparatus.

With the above and other objects in view my invention consists in the apparatus and processes hereinafter more fully described and illustrated by means of, and with reference to, the accompanying drawing showing some modifications of the invention.

On the accompanying drawing.

Figure 1:
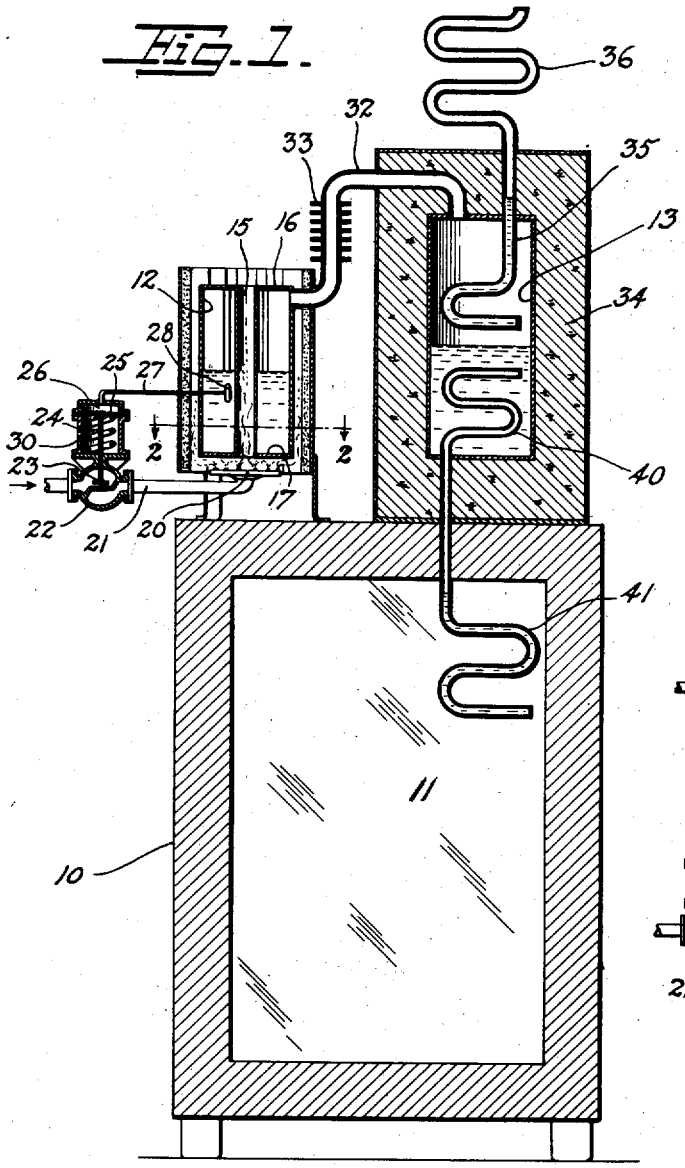
Fig. 1 shows a refrigerating apparatus or system in accordance with the present invention.
Figure 2:
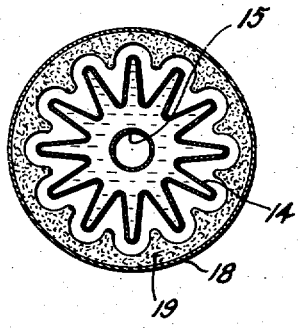
Fig. 2 is a section taken on a line 2—2 of Fig. 1.

Referring more particularly to Fig. 1, reference character 10 designates an insulated casing for a space 11 which is to be refrigerated. This insulated casing may be termed a cabinet. Adjacent to the cabinet and extending thereinto is the refrigerating apparatus which consists principally of a combined generator and absorber 12 and a distributor 13 which is a combined condenser and evaporator. Generator 12 contains refrigerant fluid in solution, which may be, for example, ammonia dissolved in water. The generator consists of an outer shell 14 (Fig. 2) which is made with convolutions to provide large surface, an inner flue 15, a top 16 and a bottom 17. Surrounding the generator is a casing 18 containing insulation 19 arranged to project into the convolutions of shell 14. While I am describing a particular form of generator it is to be understood that any type of structure may be used as a generator provided it has the requisite tightness and extent of surface.

Beneath the generator is a gas burner 20. While other means for heating may be used, I prefer gas due to its low cost. Gas is supplied to gas burner 20 by way of conduit 21 in which is interposed a control valve 22. Valve 22 comprises a movable disc 23 which is connected by means of a stem 24 to a diaphragm 25. Diaphragm 25 forms one side of a diaphragm chamber 26. Diaphragm chamber 26 is connected by tube 27 to a thermostatic bulb 28 within the liquid space of generator 12. Bulb 28, tube 27 and diaphragm chamber 26 contain a volatile fluid which expands on rise of temperature. This expansible fluid on increase of temperature, creates a pressure against the upper side of diaphragm 25, the reaction of which is taken up by spring 30 surrounding stem 24. The valve and its cooperating parts are arranged so that the gas supply is diminished upon rise of temperature. It is to be understood that any type of valve may be used which operates to perform the desired function as hereinafter pointed out.

The upper part of generator 12 is connected to the upper part of distributor 13 by means of conduit 32. Surrounding conduit 32 there are cooling flanges or other rectifying means 33. The distributor 13 is a well insulated pressure receptacle, its insulation being indicated by reference character 34. In the upper portion of distributor 13 is a boiling member 35 which is connected to a condensing member 36 outside distributor 13 and in contact with atmospheric air. In the form illustrated, a single piece of tube is used, which passes through insulation 34 and which is bent inside distributor 13 and outside distributor 13 to give extended surface for both the boiling member and the condensing member. Member 35—36 might be considered as an outgoing heat-exchanger. This heat-exchanger contains a liquid which is volatile at the temperatures of operation. Many liquids may be used, in each case the pressure being suited to desired operation. The arrangement must be such that the liquid condenses at atmospheric temperatures. Pressure within the outgoing heat-exchanger should therefore be such that the boiling point of this liquid is above atmospheric pressure. Any of various volatile substances such as ammonia, methyl chloride or sulphur dioxide may be used for this purpose.

In the lower portion of the distributor 13 is a condensing member 40 which is connected to a boiling member 41 within cabinet 11. Likewise in this case a single piece of pipe is used which is extended within the distributor and within space 11. Member 40—41 may be termed an incoming heat-exchanger. The incoming heat-exchanger is likewise filled with a volatile fluid such as ammonia, methyl chloride or sulphur dioxide. Like the outgoing heat-exchanger the incoming heat exchanger is hermetically sealed and the pressure within the same fixed to give boiling at the desired temperature.

The operation is as follows:

Burner 20 is lighted and heat is applied to generator 12, whereupon ammonia vapor is driven from solution and passes through conduit 32 into distributor 13. The ammonia vapor thus expelled is of high temperature relative to the liquid temperature within the outgoing heat-exchanger 35—36. This heat causes vaporization or boiling of the liquid within member 35 and the vapor formed within member 35 passes upwardly into member 36 where it is condensed due to the lower temperature of atmospheric air. If desired, liquids may be chosen and the arrangement such that there is vacuum within the heat exchangers. Thus the outgoing heat-exchanger carries heat out from distributor 13 and gives it up to the atmosphere. This results in condensation of ammonia and the assemblage of liquid ammonia in distributor 13. In this operation, heat is not transmitted downward into exchanger 40—41 because the heat transmitting portion of the heat exchanger 40—41 is filled with vapor and vapor is a very poor transmitter of heat. During this process of boiling off, there is no appreciable effect produced upon the contents of space 11.

The boiling off in the generator continues until a given degree of expulsion has taken place, that is, until the temperature in the generator has risen to a given degree. Where ammonia is used, this temperature may be e. g. 130° C. or about 265° F. When this temperature has been reached, the liquid in bulb 28 has expanded to such an extent that valve 22 is closed as a result of which the supply of heat is shut off. Valve 22 is preferably made so that it snaps open and shut quickly.

The supply of heat being shut off from generator 12, this member becomes an air cooled condenser and the atmospheric air circulating within casing 18 serves to cool the contents of the generator. The result of this cooling is an absorption back into solution of the liquid within the generator. This liquid draws ammonia through conduit 32 which results in the ebullition of the liquid ammonia within distributor 13. The transfer of ammonia from liquid to gaseous form within distributor 13, takes up heat and lowers the temperature. Consequently the pressure is lowered within member 40 and, due to this lowering of pressure, ebullition takes place within member 41. The liquid in member 41 then boils and passes into member 40 wherein it is condensed by the lower temperature resulting from the absorption of heat by the ammonia in passing from liquid to vapor form. Member 40 thus acts as a condenser. The boiling within member 41 causes absorption of heat and this heat is taken from space 11 as a result of which space 11 is refrigerated. In this process, due to the low temperature, the air cooling of member 36 has no effect.

This reversed operation wherein fluid passes from distributor 13 into generator 12 continues until the temperature in generator 12 has lowered to the point where valve 22 again opens. The gas then again ignites and the process begins again. In order that the burner may be automatically lighted a pilot flame may be used, or other means employed as will be evident to the person skilled in the art.

Figure 3:
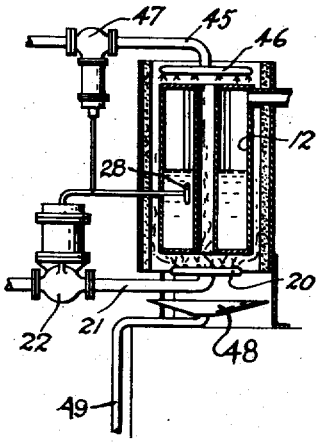
Fig. 3 shows a modification of a portion of the apparatus of Fig. 1.

In the modification shown in Fig. 3, water cooling is used instead of air cooling on the return operation. A water supply conduit 45 is connected to a spray member 46 situated above generator 12. A valve 47 controls flow of cooling water through conduit 45. Valve 47 is automatically controlled by thermostatic bulb 28. When thermostatic bulb 28 operates to close valve 22 and shut off gas to the burner, it then operates to open valve 47 admitting water to spray 46 and causing water to flow over the generator. When the temperature has decreased to a predetermined point, the water valve is shut off and the burner again lighted. Instead of a spray, a cooling coil may pass through the generator. A tray 48 collects the cooling water and conduit 49 leads it to waste.

While I have described my invention as applied to some embodiments it will readily be seen that it is not limited to any particular structural embodiment.

Having thus described my invention, what I claim is:

1. The process of refrigerating which comprises expelling a refrigerant from solution, conducting expelled refrigerant to an insulated enclosure, transferring heat from the vapor thus formed to a heat-exchanging liquid and causing said heat-exchanging liquid to boil, transferring heat from the vapor of said heat-exchanging liquid to the atmosphere by fluid movement through the insulation of the enclosure, condensing the expelled refrigerant due to the transfer of heat to the atmosphere, accumulating the condensed refrigerant in the insulated enclosure, cooling the solution and reabsorbing the accumulated refrigerant thereinto, lowering the pressure of a second heat-exchanging liquid due to the reabsorption and causing it to boil whereby the second heat-exchanging fluid is moved through the insulation of the enclosure and the space surrounding said second heat-exchanging liquid is refrigerated.

2. Refrigerating apparatus comprising, in combination, a generator, an insulated distributor, a communication between the generator and the distributor, a hermetically closed heat exchange member having a lower portion situated within said distributor and an upper portion surrounded by the atmosphere extending through the insulation around the distributor, a second heat exchange member also hermetically closed having an upper portion situated within said distributor and a lower portion outside the distributor and extending through the insulation around the distributor and walls forming a space to be refrigerated surrounding the last mentioned lower portion.

3. Refrigerating apparatus comprising in combination, a generator, an insulated distributor connected thereto and two boilers extending through the insulation around the distributor, one having its vapor space in the distributor, and the other having its liquid space in the distributor.

4. Refrigerating apparatus comprising, in combination, a generator, means to alternately heat and cool said generator, an insulated distributor arranged to alternately receive vapor from and give up vapor to the generator, a boiler having its liquid space in the distributor and its vapor space in the atmosphere and a second boiler having its vapor space in the distributor and its liquid space within a place to be refrigerated.

5. Refrigerating apparatus comprising, in combination, a generator, a distributor vessel, heat insulating material completely surrounding said distributor vessel, a hermetically sealed, vertically extending single pipe partly filled with liquid having its lower end situated within the distributor vessel, extending through the heat insulating material and having its upper end in the atmosphere, a second vertically extending single pipe also hermetically sealed and partly filled with liquid having an upper portion situated within the distributor vessel, extending through the heat insulating material and having a lower portion outside the distributor vessel and walls forming a space to be refrigerated surrounding the last mentioned lower portion.

6. Apparatus of the type set out in claim 5 wherein the level of liquid in the second mentioned vertically extending pipe is outside the distributor vessel.

7. Refrigerating apparatus comprising a cabinet, a generator situated on top of said cabinet, a distributor vessel situated on top of said cabinet, heat insulating material surrounding said distributor vessel, a communication between the generator and the distributor vessel, a hermetically sealed heat exchange member partly filled with liquid having a lower portion within said distributor vessel and an upper portion surrounded by atmosphere and a second heat exchange member also hermetically sealed and filled partly with liquid having an upper portion in said distributor vessel and a lower portion within said cabinet.

8. Refrigerating apparatus comprising, in combination, a generator, a distributor vessel, heat insulating material surrounding said distributor vessel, a hermetically sealed vertically extending pipe having its lower portion situated within the distributor vessel, extending through the heat insulating material, having its upper portion in the atmosphere and partly filled with liquid so that vapor is in the portion of the pipe passing through the insulation, a second vertically extending pipe also hermetically sealed, having an upper portion situated within the distributor vessel, extending through the heat insulating material, having a lower portion outside the distributor vessel and partly filled with liquid so that there is vapor in the portion of the pipe extending through the insulation and walls forming a space to be refrigerated surrounding the last mentioned lower portion.

9. A refrigerating apparatus of the intermittent absorption type comprising in combination a generator-absorber, an insulated distributor, and a closed vessel having one portion disposed in heat exchange relation with the distributor and another portion remote from the distributor and containing a volatile substance adapted to vaporize and condense to transfer heat in one direction only between said distributor and said remote portion.

10. Refrigerating apparatus of the intermittent absorption type comprising in combination a generator-absorber, an insulated distributor, and a closed vessel having a portion located within the distributor and a portion disposed without the distributor and containing a volatile fluid adapted to vaporize and condense to effect a heat exchange in only one direction between the exterior and interior of the insulated distributor.

11. Refrigerating apparatus of the intermittent absorption type comprising, in combination, a generator-absorber, an insulated distributor, a communication between the generator and the distributor, and a hermetically closed vessel containing a volatile fluid and having a lower portion situated within said distributor and an upper portion surrounded by the atmosphere extending through the insulation around the distributor.

12. Refrigerating apparatus comprising, in combination, a generator, means to alternately heat and cool said generator, an insulated distributor arranged to alternately receive vapor from and give up vapor to the generator, and a boiler having its liquid space in the distributor and its vapor space in the atmosphere.

13. A refrigerator comprising a heat insulated cabinet, an absorption refrigerating unit of the intermittent type including a generator-absorber and a heat insulated condenser-evaporator, and a closed boiler having its vapor space in heat exchange regulation with the condenser-evaporator and its liquid space within said cabinet.

14. A refrigerator including a chamber to be cooled, an air-cooled absorption refrigerating apparatus of the intermittent type having a heat insulated evaporator, and an hermetically sealed vessel containing a volatile fluid and having its upper portion in thermal exchange relation with said evaporator and its lower portion in thermal exchange relation with said chamber.

CARL GEORG MUNTERS.